Patented Jan. 3, 1950

2,493,396

UNITED STATES PATENT OFFICE 2,493,396

RECOVERY OF SILVER FROM SOLUTIONS OF SILVER SALTS

Eduard Farber, Washington, D. C., and Matthew Sciascia, New York, N. Y., assignors to Timber Engineering Company, Washington, D. C., a corporation of Delaware No Drawing. Application September 1, 1945, Serial No. 614,092

5 Claims. (Cl. 75—108)

Our invention relates to the recovery of silver from solutions of silver salts, and especially from very dilute solutions of such salts. Such solutions occur in various industries. For example silver salts are contained in the tail waters from certain treatments of ores or alloys, and in spent solutions of photographic processings. In various such cases also the silver is present in complex form, and may be admixed with relatively considerable quantities of other chemicals. Our process is capable of recovering silver from such solutions and from solutions containing as little as one one-hundredths of one percent of silver.

Primarily our silver-recovery process further concentrates the silver, and concentrates it to such a degree and in such a form that it then is recoverable quite readily by further operations. The process is based on a special affinity (which may be either chemical or physical in nature) that we have found exists between silver on the one hand and lignin and ligninic residues on the other, and on our further discovery that the attraction of one for the other can be enhanced and made more effective by a preliminary activation of the lignin or residue, speaking generally, serves to remove mineral contaminations and other non-ligneous materials that may be entrained with the lignin or residue. Activation by alkaline substances such as sodium or calcium hydroxide or calcium chloride as later described, is contemplated especially. Speaking generally accordingly, our process consists in bringing the dilute silver-containing solution and ligninic material together under conditions permitting adsorption of silver by the lignin, and the lignin preferably having first been activated, and then separating the ligninic material from the liquid of the mixture or from the major part of the liquid. The ligninic material contains the major part or all of the silver of the initial solution, but in such a higher degree of concentration, up to a few hundred times greater, that its silver content can be recovered from these solids quite readily by appropriate processes. Our invention comprehends also new compositions of matter adapted to concentrate the silver or silver salt solutions.

Speaking generally, the adsorption of silver by ligninic substances takes place under neutral or nearly neutral conditions. Either distinct acidity or distinct alkalinity tends to retard or prevent the adsorption, and an acidity of a pH of something less than 4 and of lower numbers even tends to reverse the operations and release from the ligninic any silver that may have been adsorbed by it previously. Accordingly solutions containing the silver or solutions in which the adsorption is to occur may be neutralized more or less as may be necessary or desirable as a part of the operations. Further, elevated temperatures tend to retard or restrain the adsorption per se. In some instances however, an elevated temperature may so hasten the bringing of the silver to the ligninic that the net result of the elevated temperature is to raise the adsorption rate. For example when the initial silver solution or a solution in which the adsorption is to take place is viscous, an elevated temperature to reduce the viscosity may hasten the reaction materially. In some instances therefore an elevated temperature may be justified although the tendency of an elevated temperature is to retard or restrain adsorption per se.

The ligneous material of the process may be natural lignin, i. e. such as would result from the removal of the cellulose and other non-ligneous materials from vegetation without chemically changing the lignin of the vegetation. On the other hand the ligneous material may be the ligneous residue of a chemical operation on vegetation that modifies the lignin. For example, it may be the ligninic material recoverable from the "black liquor" by-product of the alkali process of making paper, or it may be the ligninic residue of the hydrolysis of wood, as in the manufacture of sugar from wood. As another example, the ligneous material of the process may be the material that is precipitated by adding acid to the reaction liquor of the alkali-alkaline-sulfite process of extracting cellulose (and possibly some lignin) that is described in the copending application of Eduard Farber, Serial No. 580,084, filed February 27, 1945; as this last reference indicates, the ligninic material of our process may be accompanied by or may contain some pentosans, hexosans and wood extractives or their derivatives, as well, as a lignin derivative or derivatives. For conciseness hereafter in this specification and claims, we use the word "lignin" as including both natural lignin and all ligninic residues of chemical actions on vegetation.

The preliminary activation of the lignin to enhance its effectiveness, may include a treatment with a dilute mineral acid or acids to remove mineral matters, if a noticeable quantity of such matters is entrained with the lignin. For example the lignin obtained as the residue of wood hydrolysis may contain iron compounds in an amount of up to 1%. Washing by means of very dilute mineral acid, especially nitric, will remove most of such iron compounds, thereby freeing the surface of lignin particles for the adsorption or binding of the silver. The lignin is then separated from the acid liquor, and usually washed, e. g. with water, to free it of the remnants of acid. It may or may not be dried.

Preferably however, regardless of whether or not the lignin is thus treated to remove mineral matters, we give the lignin preliminarily an activating treatment of such a nature as to remove at least entrained non-ligneous matters such as sheaths or covers of the ligneous fibers or masses, and to this end we prefer a treatment with sodium hydroxide or calcium hydroxide, or calcium chloride as before indicated, or with both one of the hydroxide and the chloride. For example, the lignin may be washed for say five or ten minutes in a solution of from about five one-hundredths (0.05) to above five-tenths (0.5) of a part of sodium hydroxide or calcium hydroxide and from one-tenth (0.1) of a part to two (2) parts of calcium chloride in from three hundred (300) to one thousand (1000) parts of water, all by weight, heated to more than 75° C. and preferably to about 95° C. As an alternative, it may be washed in a solution of between one (1) and ten (10) parts of calcium chloride in about five hundred (500) parts of water, and then in a solution of between two one-hundredths (0.02) and four-tenths (0.4) of a part of lime (Ca(OH)$_2$), or of sodium hydroxide, in about five hundred (500) parts of water, each heated to more than 75° C. and preferably to about 95° C. Treatment in either of these two latter solutions alone is better than no pretreatment; treatment in both is still better. However the proportions above are not critical. In any such instance the solution may be a saturated solution. Also neither the temperature nor the length of the pretreatment is critical. All are subject to considerable variation as will be understood after such pretreatment the lignin may be dried before being subjected to the silver reaction, or merely most of the pretreatment liquid extracted and the activated lignin used wet.

For each part of metallic silver of the dilute solution to be treated, we use between about four (4) and about twenty-five (25) parts of the lignin, by weight. However, the proportions are subject to considerable variation, and especially variation dependent on the mode of bringing the lignin and silver together, and the complexity of the silver salts of the initial solution. To speed the reaction, especially when a viscous solution is being dealt with, heat may be applied to raise the temperature as before pointed out although elevated temperatures tend to restrain the adsorption per se.

The lignin and silver can be brought together in various ways.

For example, the two may be brought together by applying the silver-containing solution to insoluble lignin in solid form, or vice versa. If the solution is a viscous one it may be heated, say to about 90° C. to reduce the viscosity and then hasten the reaction. E. g. the silver-containing solution, heated to about 90° C., can be passed through a column or other mass of broken (say powdered) lignin. In such cases the proportions may be from about fourteen (14) to about twenty-five (25) parts of the lignin to one (1) part of the metallic silver contained in the silver salt or salts, by weight. The silver is left on or with the lignin as the liquid of the solution is withdrawn from or passes through the lignin.

Or, the lignin having been rendered soluble in alkali or alkaline water, may be added to the silver salt solution or vice versa. For example, lignin, or most of the lignins, can be made alkali-soluble by heating with about an equal quantity of sodium hydroxide, say according to the co-pending application Serial No. 593,101 of Eduard Farber now Patent No. 2,453,213. Or again, the lignin may be dissolved in an alkali and this solution added to the silver salt solution. In either case silver and lignin are precipitated together. When the reaction is thus to take place in a solution, the proportions may be from about five (5) to about fifteen (15) parts of lignin to one (1) part of silver, by weight. Usually we heat the reacting mixture, or the solution before adding the lignin. According to the nature of other substances that may be dissolved with the silver, some acidification, say to a pH of about 5 or less, by any convenient acid, may be necessary to bring about a quick settling of a precipitate rich in silver. As an alternative to acidification, a small amount of a reducing substance or substances can be added to the liquor, such as carbohydrates, aldehydes and polyhydroxyl compounds such as glycerine and glucose. About four-tenths (0.4) of a part of glycerine to one (1) part of lignin, or the equivalent, is satisfactory. Reducing substances, and alkalis, can be mixed with lignin prior to use, in suitable proportions as above indicated, and thereby ready-to-use mixtures formed capable of precipitating silver by mere addition to solutions of silver salts, with or without heating. At room temperatures the reaction and setting may require several hours, but heating, say to the boiling point of the reaction mass, speeds the separation of a heavy precipitate and leaves a clear solution free of silver.

The silver can be obtained from its admixture with the lignin in various ways. For example, dilute acid can be added to a lot of lignin having adsorbed silver and the two heated to boiling; as before indicated the acid nature of the mixture causes the lignin to release its silver, so that on filtration after a little time the silver is recovered as a solution of its salt. By the use of dilute nitric acid for instance, the silver is recoverable from the lignin in the form of a 5% solution or more of silver nitrate. Again, the lignin-silver can be burned, and as and when necessary any impurities that may have accumulated dissolved fractionally and the ash washed away, thus leaving the silver.

The following are some specific examples of our process.

*Example 1.*—Activate twenty (20) grams of powdered lignin by treating it with a hot calcium hydroxide solution as described above. Place the activated lignin, in powdered form, in a container about one and one-fourth (1¼) of an inch in diameter, thus forming a column about four and one-half (4½) inches long. Flow through this about nine (9) liters of a substantially neutral or neutralized 0.01% silver nitrate solution, permitting the solvent to run off. The silver is deposited on the lignin, and can be recovered in the form of a 5% solution of silver nitrate by treating the silver-lignin mass with an appropriate quantity of dilute nitric acid at boiling temperature. Incidentally, after the lignin has been freed of its deposit of silver in this manner, it can be washed again with calcium hydroxide solution and then is ready for reuse.

*Example 2.*—Proceed in the same manner as in Example 1 to the point where the admixture of silver and lignin is obtained. Then burn the mixture, and remove the resulting ash by washing and sedimentation. The silver of the initial solution is left in the form of the metal.

*Example 3.*—Take fifteen (15) grams of lignin activated by acid and alkali washing as described above. Mix this with six (6) grams of glycerine and twenty-nine (29) grams of sodium hydroxide. This constitutes a ready-made composition capable of precipitating silver, and can be prepared and then stored for use later. When silver is to be precipitated, add such a quantity of this mixture to one (1) liter of a spent photographic solution containing, say, about 0.2% silver. The silver in this instance is in the form of complex salts. The alkali helps to break the complex of silver. Some of the lignin may remain undissolved. Heat the mixture to nearly boiling until precipitation ceases. The precipitation leaves about 950 c. c. of a clear solution that can be poured off. Filtration under pressure removes more silver-free solution from the sediment. The precipitate contains practically all the silver of the initial solution, as well as lignin. Burn the precipitate. Fractionally dissolve the impurities of the burned residue and wash out the ash. The silver remains in the form of the metal.

*Example 4.*—Take five (5) grams of lignin and pretreat it by heating with an equal quantity of sodium hydroxide dissolved in water until the lignin is dissolved. Add this solution to one (1) liter of an aqueous solution containing one (1) gram of silver nitrate. Heat this mixture to about 80° C. and acidify by sulphuric acid to a pH of about 4. A precipitate then is thrown down which contains about 0.62 gram of silver. Filter the precipitate from the liquid, add a quantity of dilute nitric acid to the precipitate, and boil. The silver leaves the lignin and forms silver nitrate in solution.

It will be understood that our invention is not limited to the details mentioned above except as appears hereafter in the claims.

We claim:
1. A process for recovering silver from a dilute solution of a silver compound which comprises contacting said solution with an alkali activated solid insoluble lignin, separating the solution therefrom and recovering silver from said activated lignin said lignin having been activated by the removal of non-ligneous materials therefrom by washing with an alkali.

2. A process for recovering silver from a dilute solution of a silver compound, which comprises contacting said solution with a solid insoluble lignin, separting the solution therefrom and recovering the silver from the lignin, said lignin having been activated by the removal of minerals therefrom by washing with a dilute mineral acid and the removal of organic non-ligneous materials therefrom, by washing with an alkali, said acid and said alkali being non-reactive with said lignin.

3. The process of claim 2 wherein the alkali is sodium hydroxide.

4. The process of claim 2 wherein the alkali is calcium hydroxide.

5. The process of claim 2 wherein the alkali is in dilute aqueous solution.

EDUARD FARBER.
MATTHEW SCIASCIA.

REFERENCES CITED

The following references are of record in the file of this patent:

UNITED STATES PATENTS

| Number | Name | Date |
|---|---|---|
| 433,074 | Drautz | July 29, 1890 |
| 1,448,475 | Weisberg | Mar. 13, 1923 |
| 1,592,173 | Bardt | July 13, 1926 |
| 2,162,936 | Burrell | June 20, 1939 |
| 2,205,792 | Ham | June 25, 1940 |

OTHER REFERENCES

"Chemical Abstracts," vol. 40, (1946), pages 2248–9.

"Journal of Industrial and Engineering Chemistry," vol 37, January 1945, pages 70–73.